United States Patent
Buesser et al.

(10) Patent No.: US 11,593,823 B2
(45) Date of Patent: Feb. 28, 2023

(54) INTELLIGENT TRANSACTION OPTIMIZATION ASSISTANT

(71) Applicant: INTERNATIONAL BUSINESS MACHINES CORPORATION, Armonk, NY (US)

(72) Inventors: Beat Buesser, Ashtown (IE); Adi I. Botea, Dublin (IE); Bei Chen, Blanchardstown (IE); Akihiro Kishimoto, Castleknock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 16/747,280

(22) Filed: Jan. 20, 2020

(65) Prior Publication Data
US 2021/0224834 A1    Jul. 22, 2021

(51) Int. Cl.
*G06Q 30/02* (2012.01)
*G06Q 30/0204* (2023.01)
*G06N 20/00* (2019.01)
*G06Q 30/0282* (2023.01)
*G06Q 50/00* (2012.01)
*G06N 5/04* (2023.01)

(52) U.S. Cl.
CPC .......... *G06Q 30/0205* (2013.01); *G06N 5/04* (2013.01); *G06N 20/00* (2019.01); *G06Q 30/0282* (2013.01); *G06Q 50/01* (2013.01)

(58) Field of Classification Search
CPC .......... G06Q 30/0205; G06Q 30/0282; G06Q 50/01; G06N 20/00; G06N 5/04

USPC ....................................................... 705/7.31
See application file for complete search history.

(56) References Cited

U.S. PATENT DOCUMENTS

| 2004/0024769 | A1* | 2/2004 | Forman ................ G06K 9/6282 |
| 2011/0225068 | A1 | 9/2011 | Figueroa et al. |
| 2013/0325548 | A1* | 12/2013 | Kulkarni ............ H04M 15/8011 705/7.29 |
| 2014/0156450 | A1 | 6/2014 | Ruckart et al. |
| 2014/0195396 | A1* | 7/2014 | Bhakta .................. G06Q 40/02 705/35 |

(Continued)

FOREIGN PATENT DOCUMENTS

CN          105405032 A      3/2016

OTHER PUBLICATIONS

Artificial intelligence (AI) and its implications for market knowledge in B2B marketing. Paschen, Jeannette; Kietzmann, Jan; Kietzmann, Tim Christian. The Journal of Business & Industrial Marketing 34.7: 1410-1419. Emerald Group Publishing Limited. (2019).*

(Continued)

*Primary Examiner* — Timothy Padot
(74) *Attorney, Agent, or Firm* — Griffiths & Seaton PLLC

(57) ABSTRACT

Embodiments for using an intelligent transaction optimization assistant by a processor. One or more actions to enhance a transaction experience of one or more users may be provided according to one or more selected constraints learned via a machine learning operation from previous transaction experiences, user behavior relating to the one or more previous transaction experiences, transaction experiences shared amongst entities associated with a social network, or a combination thereof.

17 Claims, 8 Drawing Sheets

(56) References Cited

U.S. PATENT DOCUMENTS

| | | | | |
|---|---|---|---|---|
| 2015/0220999 A1* | 8/2015 | Thornton | ............ | H04M 15/805 |
| | | | | 705/14.66 |
| 2015/0332311 A1* | 11/2015 | Patel | ................. | G06Q 30/0251 |
| | | | | 705/14.43 |
| 2019/0114689 A1* | 4/2019 | Wang | ................. | G06Q 30/0631 |
| 2019/0130378 A1 | 5/2019 | Miyata | | |
| 2019/0251593 A1* | 8/2019 | Allouche | ........... | G06Q 10/0639 |
| 2020/0302510 A1* | 9/2020 | Chachek | ................ | G06V 20/52 |

OTHER PUBLICATIONS

Information extraction from receipts using machine learning. Karlovcec, M.. 2011 33rd International Conference on Information Technology. Interfaces: 477-80. IEEE. (2011) (Abstract).*

* cited by examiner

INTELLIGENT TRANSACTION OPTIMIZATION ASSISTANT

BACKGROUND OF THE INVENTION

Field of the Invention

The present invention relates in general to computing systems, and more particularly to, various embodiments for using an intelligent transaction optimization assistant by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a field of artificial intelligence that uses statistical techniques to allow computers to learn from data without being explicitly programmed.

SUMMARY OF THE INVENTION

Various embodiments for using an intelligent transaction optimization assistant by a processor, are provided. In one embodiment, by way of example only, a method for using an intelligent transaction optimization assistant, again by a processor, is provided. One or more actions to enhance a transaction experience of one or more users may be provided according to one or more selected constraints learned via a machine learning operation from previous transaction experiences, user behavior relating to the one or more previous transaction experiences, transaction experiences shared amongst entities associated with a social network, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
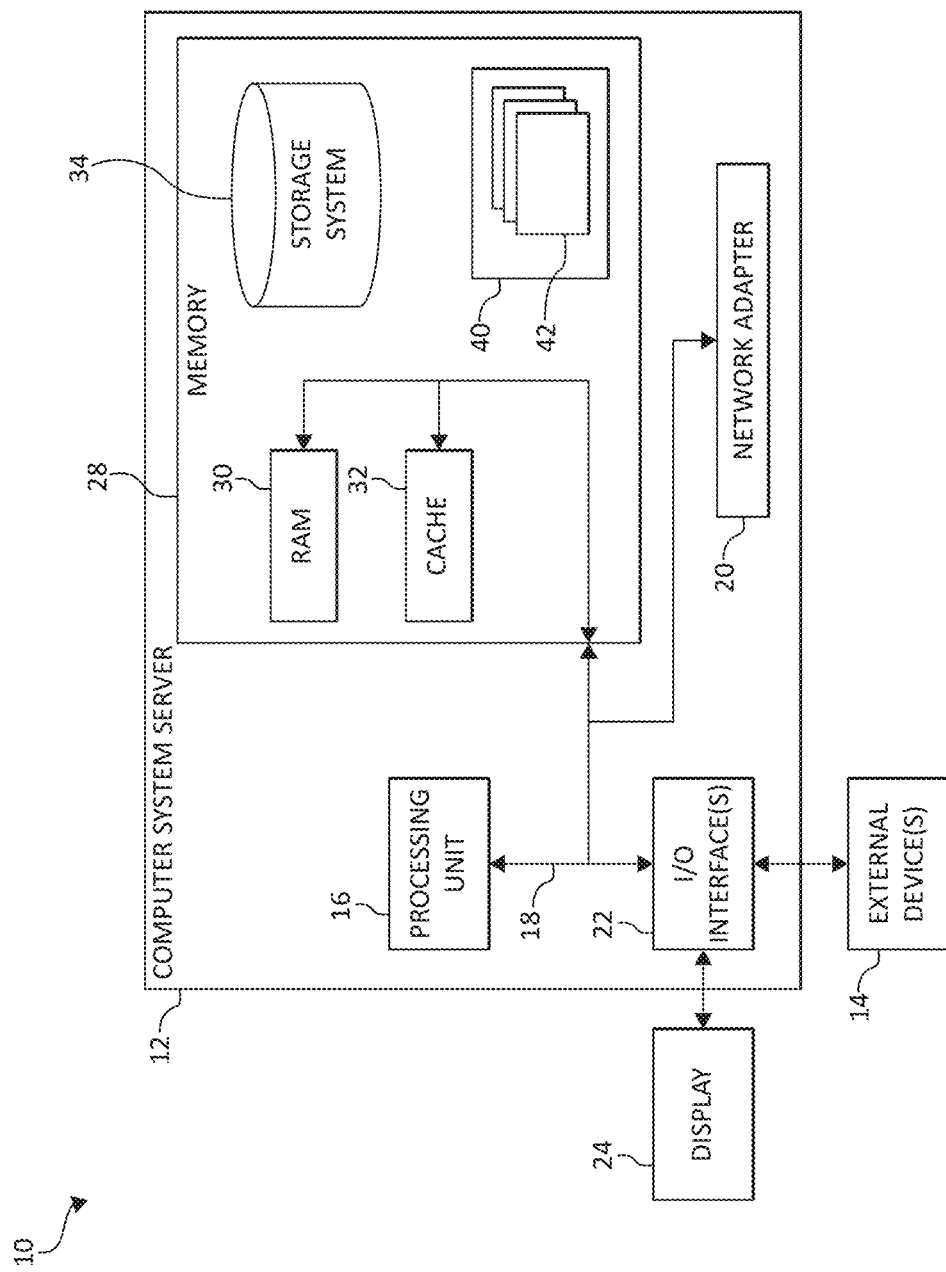
FIG. 1 is a block diagram depicting an exemplary cloud computing node according to an embodiment of the present invention.

As a preliminary matter, computing systems may include large scale computing called "cloud computing," in which resources may interact and/or be accessed via a communication system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

Additionally, machine learning operations may be employed in the use of one or more computing devices such as, for example, an internet of things ("IoT") device for assistance with transaction related activities (e.g., shopping and purchasing goods or services). For example, many potential customers/users attempt to locate and find products and services that proved discounts, sales, offers, etc., during regular and special shopping seasons. Often times, various constraints do not allow the potential customer to decide on the quality of the offering especially since there is limited knowledge of all available discounts, sales, and/or offers, which limits intelligent shopping and purchasing decision. Unfortunately, humans are unable to optimize complex problems by themselves. Thus, a need exists for an intelligent transaction optimization assistant that not only has the capacity to optimize spending for a minimum amount of money, but to optimize the overall shopping experience for purchasing necessary goods and services.

Accordingly, various embodiments as described herein provide for an intelligent transaction optimization for optimizing compute tasks or for finding efficient compute tasks for performing functions in computing environment (e.g., in a service provider environment). Said differently, the intelligent transaction optimization provides for optimizing (e.g., enhancing) a shopping and spending experience for one or more users by continuously learning from past shopping experiences, public data (e.g., freely available/accessible data from various data sources), and shopping experiences shared by amongst a social network (e.g., friends, family, known associates/colleagues).

In an additional aspect, one or more actions to enhance a transaction experience of one or more users may be provided according to one or more selected constraints learned via a machine learning operation from previous transaction experiences, user behavior relating to the one or more previous transaction experiences, transaction experiences shared amongst entities associated with a social network.

In an additional aspect, the present invention provides an intelligent that may include an internet of things ("IoT") (e.g., a personal assistant computing device) and prediction application for optimization of transaction related experiences. The intelligent system may include, for example: 1) receiving, as input, any combination of media data (e.g., images/photos, audio, video, etc.) of transaction receipts (e.g., a shopping/purchase receipts), advertisements, sales, promotions, discounts, or offers, public data (e.g., freely available data published on the internet), historical transaction data (e.g., historic personal spending data), location data (e.g., global positioning system "GPS"), traffic information, and always requiring one or more shopping tasks including time constraints; and 2) providing a list of instructions defining and explaining an "optimized" (e.g., enhanced) way of performing transaction related activities (e.g., shopping) for one or more objects (e.g., goods and/or services) defined, listed, and/or identified in a transaction task.

In an additional aspect, the present invention provides for use of a combination of computing devices, mobile devices, cameras, microphones, screens, and operations. The present invention may receive as input: 1) list of target products to buy, 2) a collection of data from shopping receipts and other sources from the stores, and/or 3) a tracked location of user and stores on a map using positioning methods.

The present invention optimizing shopping experiences for multiple predefined goals such as, for example, financial cost, time, and/or environmental impact by providing a list of actions including timestamps, store and location, a list of products for purchase to be executed (e.g., shopping tasks) by the user to achieve shopping results according to personal constraints. The list of shopping tasks may be split/divided into multiple sub-lists of shopping tasks to be executed by one or more users independently.

A user groups (e.g., a social media group) may be crated and maintained where shopping experiences may be shared with feedback and various datapoints may be collected for collective improvement of prediction accuracies. Additionally, a computer vision operation may be used to read text data (e.g., shopping receipts and fliers) about low price offerings.

In one aspect, the terms "shopping" and "transaction" may be used interchangeable and may be defined as commonly understood. Also, the term "shopping" may further be defined as one or more actions, tasks, or activities of purchasing products, goods, or services from one or more types of entities (e.g., a person, a business (a.k.a., a brick-and-mortar store), and/or an online business. Shopping may also include or more actions, tasks, activities, searches, or examinations of products, goods, or services with the intent to purchase/buy or enter into a "sales transaction." The term "transaction" may also be defined as the exchange or transfer of products, goods, funds, or services. Also, the term transaction may also include an agreement, communication, or movement carried out between a buyer and a seller to exchange an asset (e.g., products, goods, funds, or services) for payment. The term transaction may also include the exchange of products, goods, funds, or services. Simply put, a sales transaction may be the process of a buyer (e.g., a shopper) purchasing a product, a good, or a service from a seller (e.g., a store).

In general, "optimize" (or "enhance" which may be interchangeably with "optimize") may refer to and/or be defined as "maximize," "minimize," or attain one or more specific targets, objectives, goals, or intentions. Optimize may also refer to maximizing a benefit to a user (e.g., maximize a transaction benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of shopping/travel routes, but there may be a variety of factors that may result in alternate suggestion of a combination of shopping/travel routes yielding better results. For example, an optimization problem may search for a combination of factors that result in a minimum and/or maximum combination of routes for shopping/travel to minimize costs, carbon footprint and network disruption. Such factors may include particular shopping route characteristics, weather and water patterns (e.g., rain, wind, snow, weather patterns, etc.), location/store and/or vehicle characteristics, and/or user-defined constraints (e.g., fuel costs, energy savings, etc.). Thus, some changes to the variety of factors/parameters may result in a jump from one minimum/maximum to another minimum/maximum. In either case, resulting suggestions of a combination of shopping/travel routes, location/store and/or vehicle characteristics, machine learning models (e.g., transaction/shopping optimization model, etc.), and/or user-defined constraints may be considered "good enough," "substantially optimal," and/or "sufficiently good." Herein, the term "optimize" (or "enhanced") may refer to such results based on minima (or maxima, depending on what parameters are considered in the optimization problem) for suggesting of a combination of shopping/travel routes, location/store and/or vehicle characteristics, weather patterns/environmental conditions, machine learning models, and/or user-defined constraints.

In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It should be noted as described herein, the term "intelligent" (or "intelligence") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, intelligent or "intelligence" may refer to a mental action or process of acquiring knowledge and understanding through thought, experience, and one or more senses using machine learning (which may include using sensor-based devices or other computing systems that include audio or video devices). Intelligent or "intelligence" may also refer to identifying patterns of behavior, leading to a "learning" of one or more events, operations, or processes. Thus, the intelligent or "intelligence" model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to an intelligent or "intelligence" system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. The intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
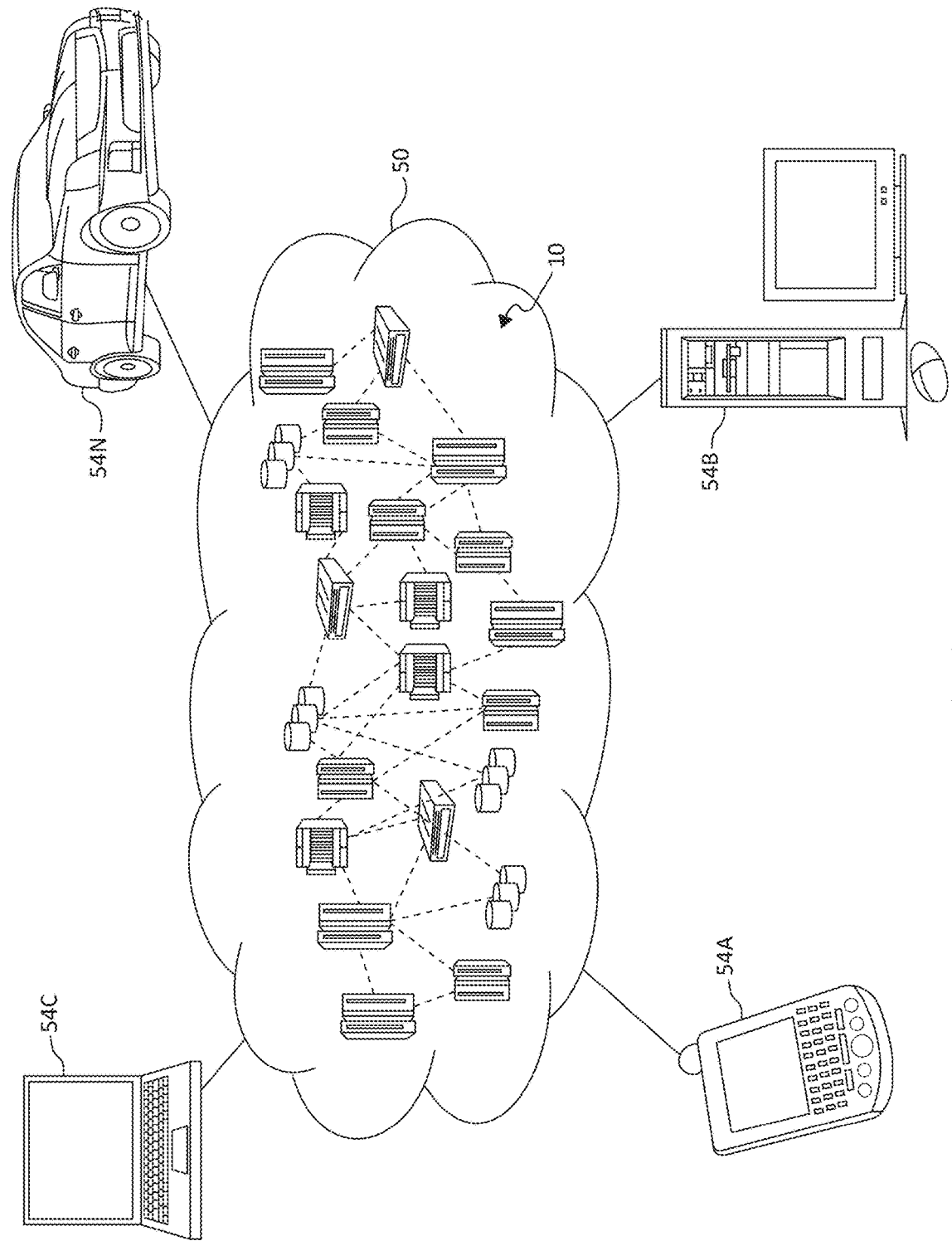
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, automobile, and/or other IoT computing device 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
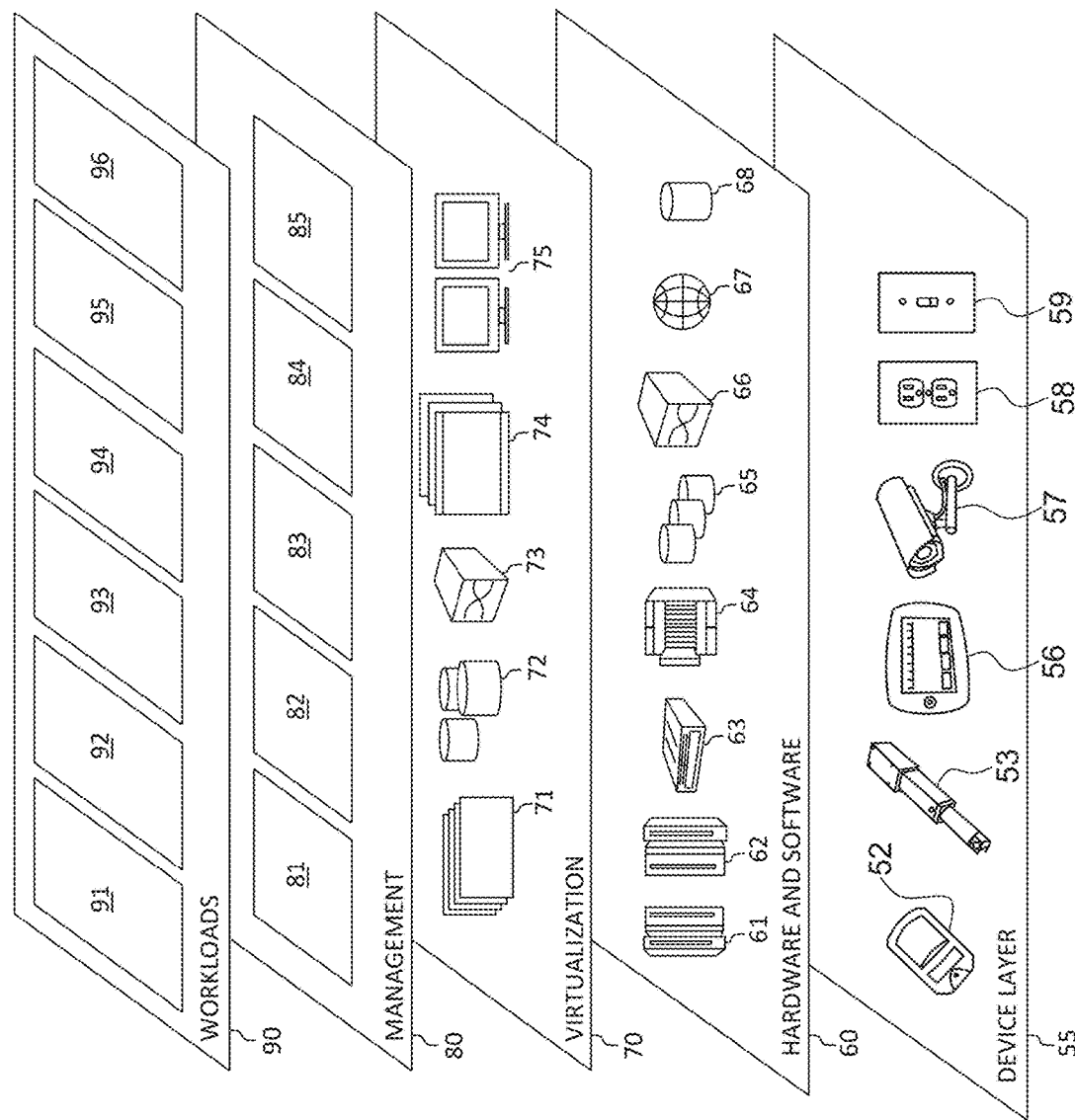
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for using an intelligent transaction optimization assistant. In addition, workloads and functions 96 for using an intelligent transaction optimization assistant may include such operations as data analytics, data analysis, and as will be further described, notification functionality. One of ordinary skill in the art will appreciate that the workloads and functions 96 for using an intelligent transaction optimization assistant may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
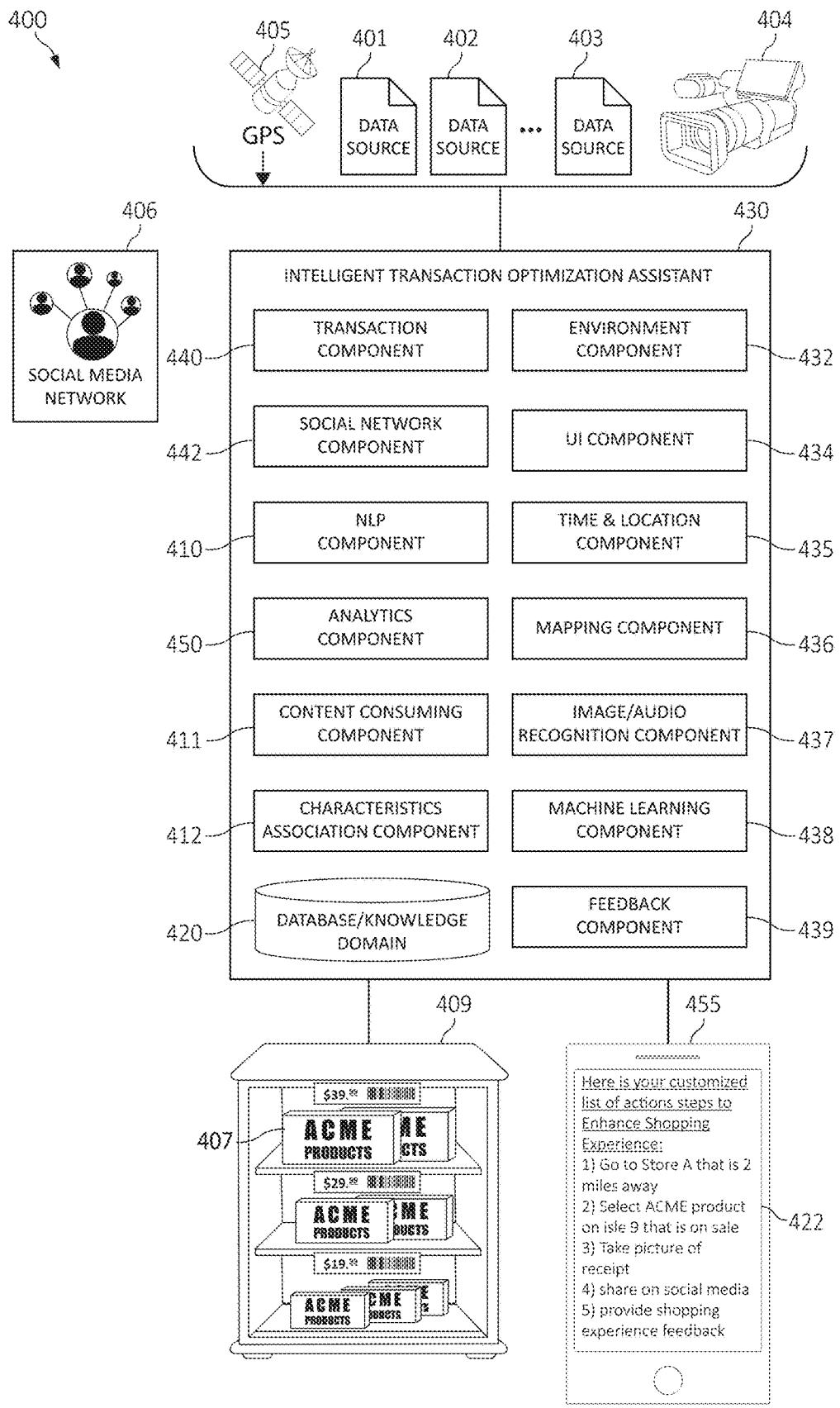
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An intelligent transaction optimization assistant 430 is shown and may be provided, for example, by the computer system/server 12 of FIG. 1.

As one of ordinary skill in the art will appreciate, the depiction of the various functional units in intelligent transaction optimization assistant 430 is for purposes of illustration, as the functional units may be located within the intelligent transaction optimization assistant 430 or elsewhere within and/or between distributed computing components.

Multiple data sources 401-406 may be provided by one or more data resources (e.g., cloud computing services, Big Data resources such as, for example, a distributed file system i.e., a Hadoop file system ("HDFS")). The data sources 401-406 may be provided as a corpus or group of data sources defined and/or identified. The data sources 401-406 may include, but are not limited to, data sources relating to one or more documents, historical records, government records, newspaper articles and images, mapping and geographical records and data, structural data (e.g., buildings, landmark, etc.), musical archive data, books, scientific papers, online journals, journals, articles, drafts, materials related to emails, audio data, images or photographs, video data, and/or other various documents or data sources capable of being analyzed, published, displayed, interpreted, transcribed, or reduced to text data. The data sources 401-406 may be all of the same type, for example, pages or articles in a wild or pages of a blog. Alternatively, the data sources 401-406 may be of different types, such as word documents, wikis, web pages, power points, printable document format, or any document capable of being analyzed by a natural language processing system.

In addition to text-based documents, other data sources such as audio, video or image sources may also be used wherein the audio, video or image sources may be pre-analyzed to extract or transcribe their content for natural language processing, such as converting from image to text, text to image, or visual recognition and analysis. For example, a photograph combined with mapping data (e.g., global positioning satellite ("GPS") data) and may be analyzed for optimizing a transaction experience (e.g., shopping experience) for a user at a particular location at a selected time (e.g., creating a 3D virtual representation of one or more products and/or services 407 located at a selected location 409 and mapping data). As an additional example, a media capturing device 404 (e.g., a camera) may use computer vision and/or have captured a photograph, audio, and/or video of a receipt such as, for example, a receipt showing the purchase of the transaction (e.g., financial purchase) for the products and/or services 407 located at a selected location 409. The image data captured by the media capturing device 404 may be analyzed and be saved to database 420 and/or shared with one or more social entities of the social network 406 (e.g., social media network). The group of data sources 401-406 are consumed for an extraction, analysis, and processing for optimizing the transaction experience of a user for one or more location based on one or more selected constraints, which may also use natural language processing (NLP) and artificial intelligence (AI).

In one aspect, by way of example only, the data sources 401-406 may be analyzed by an NLP component 410 (and a time and location component 435 if necessary) to data mine, analyze image data (e.g., a shopping receipt, an offer, sale, promotion, and/or advertisement/flier), transcribe relevant information from the content of the data sources 401-406 (e.g., documents, emails (e.g., an advertisement email), advertisements, offers (e.g., newspaper offer, television offer, radio offer, text message offer, etc.), reports, notes, records, maps, images, video recordings, live-streaming communications (e.g., a social media live stream relating to a recent shopping transaction), etc.) in order to optimize the transaction experience of a user and/or provide the information in a more searchable and displayable manner. The NLP component 410 may be provided as a cloud service or as a local service.

The intelligent transaction optimization assistant 430 may include the NLP component 410, a content consuming component 411, a characteristics association component 412, and an analytics component 450. The NLP component 410 may be associated with the content consuming component 411. The content consuming component 411 may be used for inputting the data sources 401-406 and running NLP and AI tools against them, learning the content, such as by using the machine learning component 438. It should be noted that other components of FIG. 4 may also employ one or more NLP systems and the NLP component 410 and is merely illustrated by way of example only of use of an NLP system. As the NLP component 410 (including the machine learning component 438) learns different sets of data (e.g., images, maps, landscapes, historical information, etc.), the characteristics association component 412 (or "cognitive characteristics association component") may use the artificial intelligence to make cognitive ("intelligent) associations or links between data sources 401-406 by determining images, landmarks, events, activities, historical data, structures, concepts, methods, features, similar characteristics, underlying common topics, and/or features.

Cognition or "intelligence" is the mental process of knowing, including aspects such as awareness, perception, reasoning and judgment. An AI system uses artificial reasoning to interpret the data sources 401-406 and extract their topics, ideas, semantics, characters, and/or concepts. The learned decisions, decision elements, alternatives to the decision, alternative options/choices, decision criteria, concepts, suggestions, topics and subtopics of a domain of interest, may not be specifically named or mentioned in the data sources 401-406 and is derived or inferred by the AI interpretation.

The learned content of the data sources consumed by the NLP system may be merged into the database 420 (and/or knowledge store or "knowledge domain") or other data storage method of the consumed content with learned images, landmarks/locations, events, activities (e.g., transaction/shopping experiences and purchases), historical data (e.g., historical transactions and historical transaction related experiences), structures, concepts, methods, features, similar characteristics, underlying common topics, and/or features of the data sources 401-406 providing association between the content referenced to the original data sources 401-406.

The database 420 may record and maintain the evolution of intelligent decisions, alternatives, criteria, subjects, topics, ideas, or content discussed in the data sources 401-406. The database 420 may track, identify, and associate all communication threads, messages, transcripts, media data (e.g., images/photographs, audio data, and/or video data), mapping and geographical records and data, structural data (e.g., buildings, landmark, store locations, etc.), musical archive data, books, scientific papers, online journals, journals, articles, drafts, materials related to emails, audio data, images or photographs, video data, and/or other various documents of all data generated during all stages of the development or "life cycle" of the decisions, decision elements, alternatives, choices, criteria, subjects, topics, ideas, and/or transactions/transaction related activities. The merging of the data into one database 420 (which may include a domain knowledge) allows the intelligent transaction optimization assistant 430 to act like a search engine, but instead of keyword searches, it will use an AI method of making cognitive associations between the data sources using the deduced concepts so as to optimize the transaction experience of a user.

The intelligent transaction optimization assistant 430 may include a user interface ("UI") component 434 (e.g., an interactive graphical user interface "GUI") for providing user interaction for sending or receiving one or more inputs/queries from a user (e.g., receiving various constraints related to transaction/shopping activities and/or purchase such as, for example, a transaction/shopping goal). More specifically, the UI component 434 may be in communication with a wireless communication device 455 (see also the PDA or cellular telephone 54A, the desktop computer 54B, the laptop computer 54C, and/or the other IoT computing device 54N of FIG. 2.) for also providing user input for inputting data such as, for example, data sources 401-406 and also providing user interaction for defining various transaction constraints such as, for example, a user's goal for a transaction/transaction experience, a selected time, selected location, one or more configurable boundaries/store locations, a financial cost of a transaction, a predefined threshold for completing one or more actions associated with executing a transaction, predicted positive or negative impacts upon the one or more users while executing the one or more actions, location parameters, weather conditions parameters, identified positive or negative impacts from historical transaction experiences from the one or more users or entities associated with the one or more users in a social media network, community feedback data, or a combination thereof, and/or for providing input for enhancing or adjusting the one or more configurable boundary parameters according to a selected time period, a selected location, one or more media images, the user input, an analysis operation, unstructured data from the data resources, or a combination thereof to optimize the transaction experience of a user.

The computing device 455 may use the UI component 434 (e.g., GUI) for providing input of data and/or providing a query functionality such as, for example, interactive GUI functionality for enabling a user to enter a query in the GUI 422 relating to the selected constraints and/or other parameters, domain of interest, topic, decision, alternative, criteria, or additional analysis for optimizing the transaction experience of a user. For example, GUI 422 may display a list of instructions to optimize the transaction experience of a user such as, for example, "Here is your customized list of actions to enhance a shopping experiences: 1) go to store A that is 2 miles away, 2) select ACME product on isle 9 that is on sale, 3) take a picture of the receipt (e.g., the receipt showing purchase of the selected ACME product). 4) share the image of the receipt on a social media network or with other groups of friends, family, associates, or colleagues, and 5) provide shopping experience feedback (e.g., "the ACME produce on sale at store A that is on isle 9 is cheaper than any store within a 15 mile radius.").

The intelligent transaction optimization assistant 430 may use a transaction component 440. The transaction component 440 may use data retrieved directly from one or more data sources 401-406, data stored in the database 420 (e.g., historical transaction data), data received from the user via the computing device 455, data from the time and location component 435 (e.g., a GPS device, mapping service, etc.), other components and/or a combination thereof to optimize the transaction experience of a user.

The intelligent transaction optimization assistant 430 may also include an image/audio recognition component 437 for identifying, updating, and/or enhancing media data (e.g., images, photographs, videos, audio data, live streaming data, etc.) and/or providing information relating to the plurality of images, photographs, videos, audio data, live streaming data according to a domain knowledge, which may be included in the database 420 and/or associated with the database 420. That is, the image/audio recognition component 437 may use one or more deep learning operations to analyze images for scenes, objects, faces, colors, food, text, explicit content and other subjects, and to understand the contents of images. The image/audio recognition component 437 may also enhance and classify the images, photographs, videos, audio data, and live streaming data.

The intelligent transaction optimization assistant 430 may include a mapping component 436. The mapping component 436 may provide mapping data relating to one or more locations of one or more users, locations of one or more stores, and/or locations and positioning of one or more products. For example, the mapping component 436 may include topographical maps, aerial maps, electronic maps, landscapes, building plans/architectures, product features, and design data, one or more GPS navigational tools/maps, user-selectable maps, historical maps, governmental maps, landmark data, survey data, construction maps/data, building blueprints data, roadmaps, or other geographical information or data relating to one or more aspects of the present invention for optimizing the transaction experience of a user.

The intelligent transaction optimization assistant 430 may include an analytics component 450 that may be used to analyze captured media data, user input, unstructured data from the data sources 401-406 (e.g., received from various data resources) using the one or more cognitive computing application.

In an additional aspect, the transaction component 440 may create and/or provide one or more actions to enhance a transaction experience of one or more users according to the selected constraints learned, via a machine learning operation using the machine learning component 438, from previous transaction experiences, user behavior relating to the one or more previous transaction experiences, transaction experiences shared amongst entities associated with a social network, or a combination thereof.

The transaction component 440, in association with the NLP component 410 and/or content consuming component 411, may collect data, from one or more data sources 401-406 and/or the computing device 455, relating to a list of targeted products or services offered for executing a transaction, transaction receipts, a user location, data maps associated with locations offering products or services available for executing the transaction, or a combination thereof.

The transaction component 440 may define the one or more selected constraints according to a defined transaction related goal of a user, a financial cost of a transaction, a predefined threshold for completing the one or more actions associated with executing a transaction, predicted positive or negative impacts upon the one or more users while executing the one or more actions, location parameters, weather conditions parameters, identified positive or negative impacts from historical transaction experiences from the one or more users or entities associated with the one or more users in a social media network, community feedback data, or a combination thereof.

The transaction component 440, in association with the one or more data sources 401-406, the content consuming component 411 and/or image/audio recognition component 437, may capture one or more images of one or more targeted products or services offered for executing a transaction, capture one or more images of information associated with the one or more targeted products or services offered for executing a transaction, and/or capture one or more images of one or more transaction receipts.

The machine learning component 438 may initiate a machine learning operation to: learn one or more machine learning models associated with engaging in a transaction for one or more targeted products or services, learn and identify one or more patterns of the one or more users associated with executed transactions of one or more targeted products or service, train and update the one or more machine learning model based on collected data and feedback from the one or more users, and/or create and maintain a collection of transaction experiences associated the one or more users.

The transaction component 440, in association with the one or more data sources 401-406, the content consuming component 411, the image/audio recognition component 437, the time and location component 435, and/or the machine learning component 438, may identify one or more targeted products or services offered for executing a transaction, collect data from transaction receipts associated with the transaction executed by the one or more users, and/or track a location of the one or more users in relation to locations providing the one or more targeted products or services.

The transaction component 440 may also split the one or more actions (e.g., a list of actions or tasks to perform) into a plurality of sub-actions (e.g., a list of sub-actions or sub-tasks to perform) for execution by the one or more users.

A feedback component 439 may also be included in the intelligent transaction optimization assistant 430. For example, the feedback component 439 may collect feedback information from a user relating to various aspects of a transaction related experience or the transaction itself.

The machine learning component 438 may also learn, adjust, teach, or update the one or more configurable transaction/shopping constraints for creating, enhancing, and/or optimizing a transaction experience according to the feedback information. The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, the domain knowledge may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, text data may be hyperlinked to a webpage that may describe, explain, or provide additional information relating to a transaction experience. Thus, a transaction experience may be enhanced via links to external resources that further explain, instruct, illustrate, provide context, and/or additional information to support a decision, alternative suggestion, alternative choice, and/or criteria for engaging or not engaging in a particular course of actions for optimizing a transaction experience.

In one aspect, the intelligent transaction optimization assistant 430 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.). It should be noted that each of the components of the intelligent transaction optimization assistant 430 may be individual components and/or separate components of the intelligent transaction optimization assistant 430. The intelligent transaction optimization assistant 430 may also be a computerized intelligent personal assistant (e.g., a cloud-based voice service), virtual assistant, or other type of IoT computing device.

Figure 5:
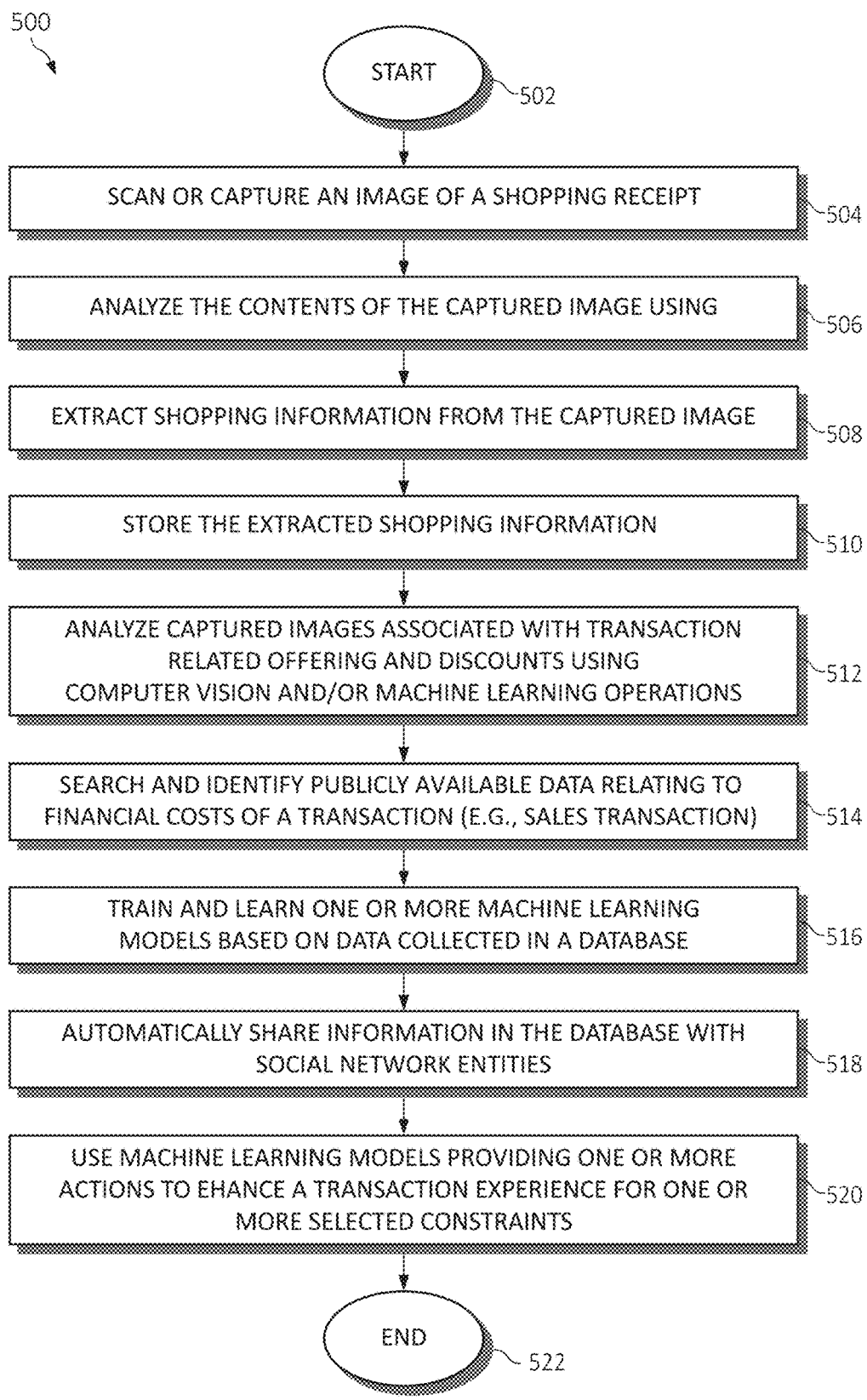
FIG. 5 is a flowchart diagram depicting an exemplary method for using an intelligent transaction optimization assistant in which various aspects of the present invention may be realized.

In view of the method 400 of FIG. 4, FIG. 5 depicts an additional system architecture of an intelligent transaction optimization assistant/system. In one aspect, one or more of the components, modules, services, applications, and/or functions described in FIGS. 1-4 may be used in FIGS. 5-8.

FIG. 5 is an additional flowchart diagram 500 depicting an exemplary method for using an intelligent transaction optimization assistant, again in which various aspects of the present invention may be realized. The functionality 500 may be implemented as a method executed as instructions on a machine, where the instructions are included on at least one computer readable medium or one non-transitory machine-readable storage medium. The functionality 500 may start in block 502.

An image (e.g., photo and/or video) of a shopping receipt may be scanned and/or captured, as in block 504. The contents of the captured image may be analyzed using computer vision, as in block 506. Shopping information may be extracted (e.g., identified, analyzed, and extracted) from the captured image, as in block 508. The extracted information may be stored (e.g., in a database), as in block 510. One or more additional images, associated with transaction related offering and discounts, may be captured and analyzed using computer vision and/or machine learning operations, as in block 512. For example, advertisements (e.g., fliers) pertaining to a current promotion, sale, low price offering, etc., may be read, scanned, and analyzed using computer vision and/or an AI operation.

Publicly available data (e.g., data published on the internet) relating to financial costs of a transaction may be searched and identified, as in block 514. For example, functionality of method 500 may include crawling the internet for publicly available information about prices of products/services, sales, promotions, discounts, offers, and/or other information (e.g., time duration of an offer such as, for example, a 24 hour only sale) related to a particular entity (e.g., a business entity).

One or more machine learning models may be trained and learned based on data collected in the databases, as in block 516. For example, the machine learning operation may be train, learn, and/or update a machine learning model based on learned shopping patterns.

Information in the databases may be shared with social network entities (e.g., share with friends via a social media network or other communication medium available for sharing data), as in block 518. One or more machine learning models providing one or more actions to enhance a transaction experience for one or more selected constraints may be used, as in block 520. The functionality 500 may end, as in block 522.

Figure 6:
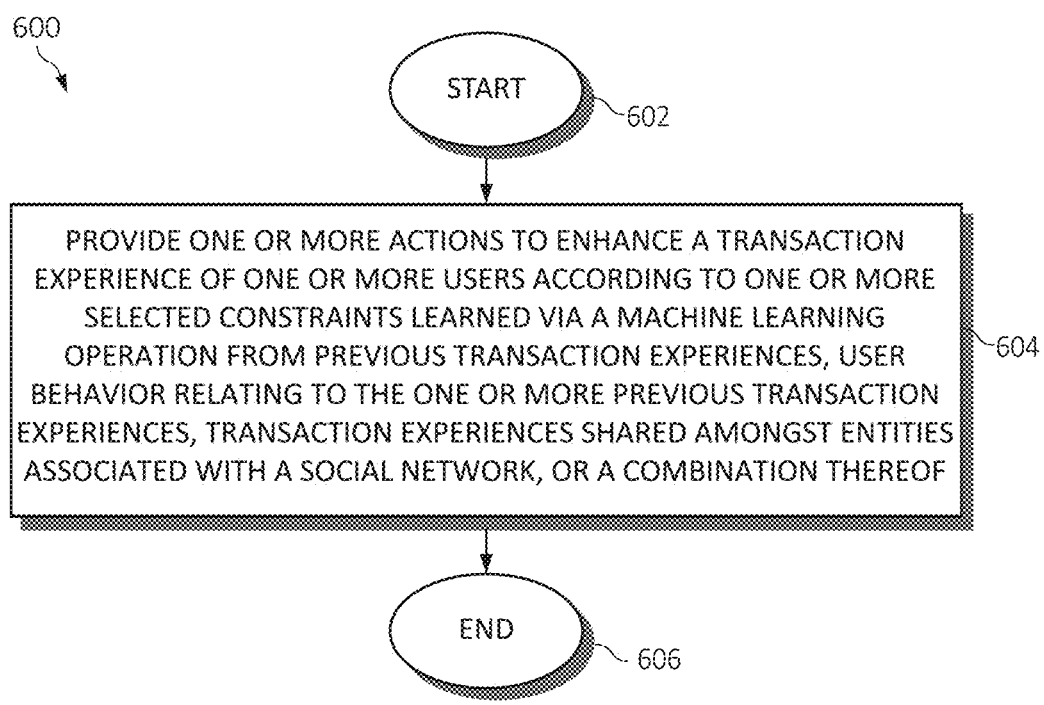
FIG. 6 is an additional flowchart diagram depicting an exemplary method for using an intelligent transaction optimization assistant in which various aspects of the present invention may be realized.

FIG. 6 is an additional flowchart diagram 600 depicting an exemplary method for using an intelligent transaction optimization assistant, again in which various aspects of the present invention may be realized. The functionality 600 may be implemented as a method executed as instructions on a machine, where the instructions are included on at least one computer readable medium or one non-transitory machine-readable storage medium. The functionality 600 may start in block 602.

One or more actions to enhance a transaction experience of one or more users may be provided according to one or more selected constraints learned via a machine learning operation from previous transaction experiences, user behavior relating to the one or more previous transaction experiences, transaction experiences shared amongst entities associated with a social network, or a combination thereof, as in block 604. The functionality 600 may end, as in block 606.

Figure 7:
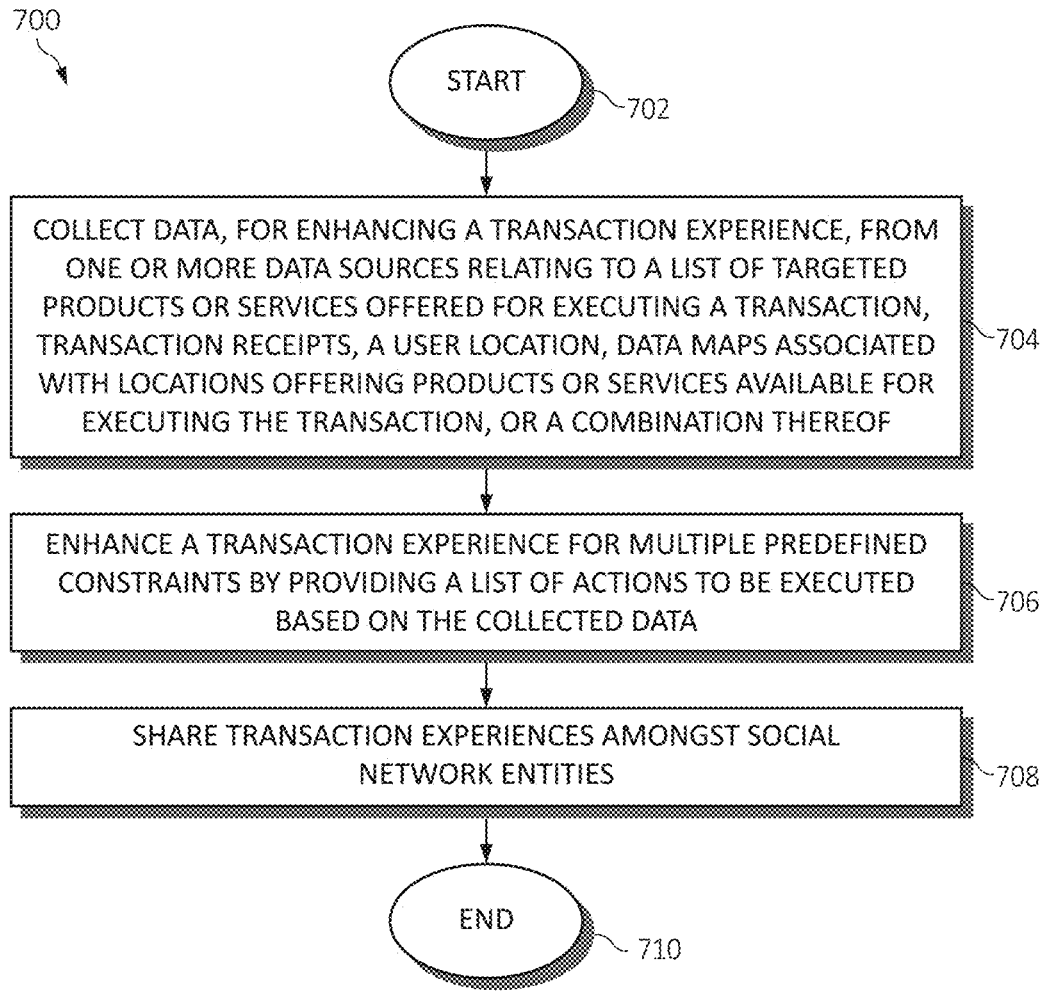
FIG. 7 is an additional flowchart diagram depicting an exemplary method for using an intelligent transaction optimization assistant in which various aspects of the present invention may be realized.

FIG. 7 is an additional flowchart diagram 700 depicting an additional exemplary method for using an intelligent transaction optimization assistant, again in which various aspects of the present invention may be realized. The functionality 700 may be implemented as a method executed as instructions on a machine, where the instructions are included on at least one computer readable medium or one non-transitory machine-readable storage medium. The functionality 700 may start in block 702.

Data, for enhancing a transaction experience, may be collected from one or more data sources relating to a list of targeted products or services offered for executing a transaction, transaction receipts, a user location, data maps associated with locations offering products or services available for executing the transaction, or a combination thereof, as in block 704. A transaction experience may be enhanced (e.g., optimized) for multiple predefined constraints by providing a list of actions to be executed based on the collected data, as in bloc 706. One or more transaction experiences may be shared amongst social network entities, as in block 708. The functionality 700 may end, as in block 710.

Figure 8:
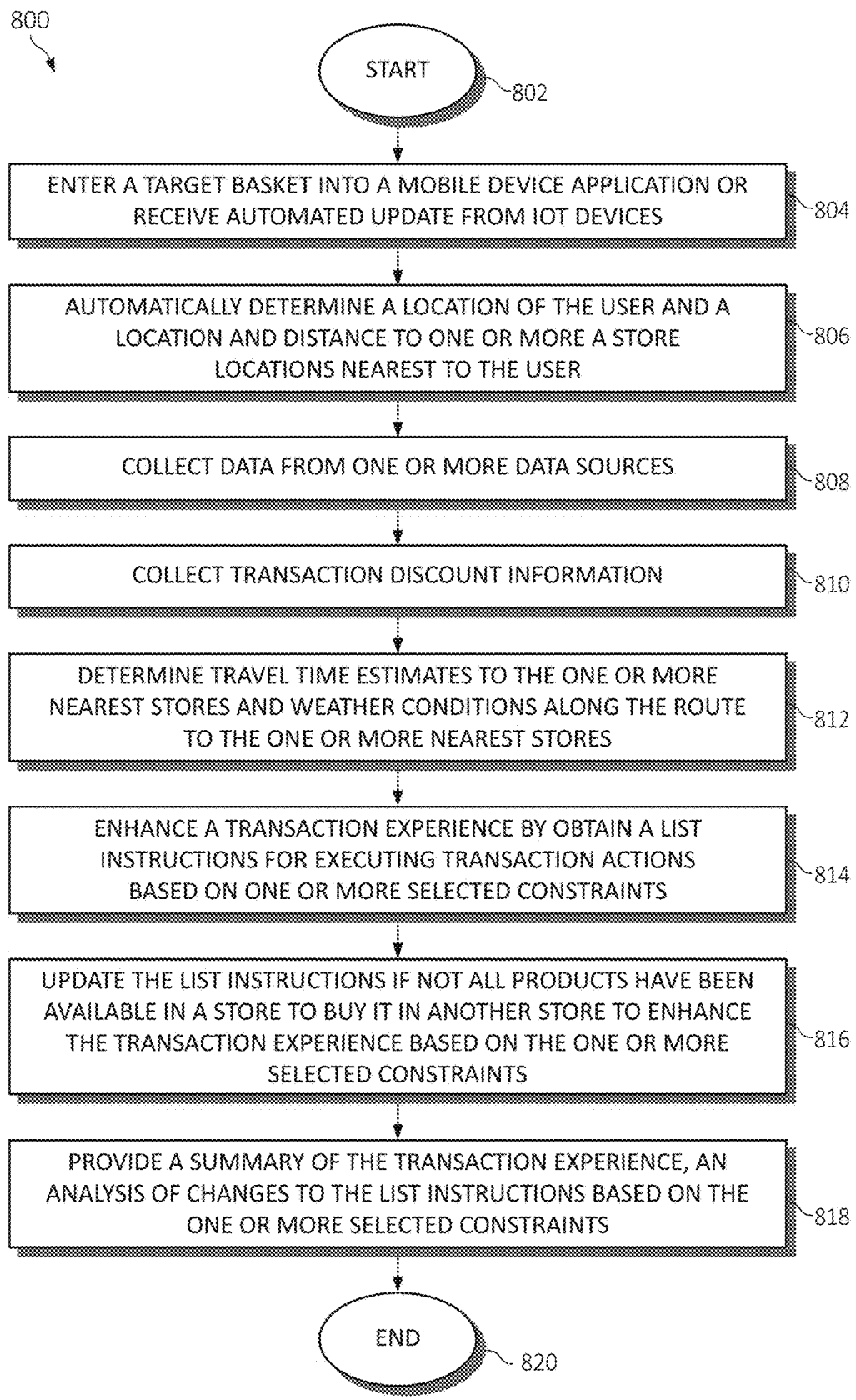
FIG. 8 is an additional flowchart diagram depicting an exemplary method for using an intelligent transaction optimization assistant, again in which various aspects of the present invention may be realized.

FIG. 8 is an additional flowchart diagram 800 depicting an additional exemplary method for using an intelligent transaction optimization assistant, again in which various aspects of the present invention may be realized. The functionality 800 may be implemented as a method executed as instructions on a machine, where the instructions are included on at least one computer readable medium or one non-transitory machine-readable storage medium. The functionality 800 may start in block 802.

A target basket (e.g., an online shopping basket/cart) may be entered into a mobile device application or receive automated update from one or more IoT devices, as in block 804.

A location of the user and a location and distance to one or more a store locations nearest to the user may be automatically determined, as in block 806. Data may be collected from one or more data sources, as in block 808. Transaction discount information may be collected, as in block 810. Travel time estimates to the one or more nearest stores and weather conditions along the route to the one or more nearest stores may be determined, as in block 812. A transaction experience may be enhanced (e.g., optimized) by obtaining a list instructions for executing transaction actions (e.g., obtain of list of shopping tasks based on one or more selected constraints, as in block 814. The list of instructions may be updated, if not all products have been available in a store, to buy the products in another store to enhance the transaction experience based on the one or more selected constraints, as in block 816. A summary of the transaction experience and an analysis of changes to the list instructions based on the one or more selected constraints may be provided, as in block 818. The functionality 800 may end, as in block 806.

In one aspect, in conjunction with and/or as part of at least one block of FIGS. 5-8, the operations of methods 500, 600, 700, and/or 800 may include each of the following. The operations of methods 500, 600, 700, and/or 800 may collect data from one or more data sources relating to a list of targeted products or services offered for executing a transaction, transaction receipts, a user location, data maps associated with locations offering products or services available for executing the transaction, or a combination thereof. The operations of methods 500, 600, 700, and/or 800 may define the one or more selected constraints according to a defined transaction related goal of a user, a financial cost of a transaction, a predefined threshold for completing the one or more actions associated with executing a transaction, predicted positive or negative impacts upon the one or more users while executing the one or more actions, location parameters, weather conditions parameters, identified positive or negative impacts from historical transaction experiences from the one or more users or entities associated with the one or more users in a social media network, community feedback data, or a combination thereof.

The operations of methods 500, 600, 700, and/or 800 may capture one or more images of one or more targeted products or services offered for executing a transaction, capture one or more images of information associated with the one or more targeted products or services offered for executing a transaction, and/or capture one or more images of one or more transaction receipts.

The operations of methods 500, 600, 700, and/or 800 may initiate a machine learning operation to: 1) learn one or more machine learning models associated with engaging in a transaction for one or more targeted products or services, 2) learn and identify one or more patterns of the one or more users associated with executed transactions of one or more targeted products or services; 3) train and update the one or more machine learning model based on collected data and feedback from the one or more users; and/or 4) create and maintain a collection of transaction experiences associated the one or more users.

The operations of methods 500, 600, 700, and/or 800 may identify one or more targeted products or services offered for executing a transaction, collect data from transaction receipts associated with the transaction executed by the one or more users, and/or track a location of the one or more users in relation to locations providing the one or more targeted products or services. The operations of methods 500, 600, 700, and/or 800 may split the one or more actions into a plurality of sub-actions for execution by the one or more users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for using an intelligent transaction optimization assistant by a processor, comprising:
    receiving data representative of historical transaction experiences, user behavior relating to the historical transaction experiences, and transaction experiences shared amongst entities associated with a social media network, wherein the historical transaction experiences further includes receipt data extracted from receipt imagery data and store data extracted from store imagery data;
    executing machine learning logic to, in a first training stage, train one or more transaction models using the data as input, wherein training the one or more transaction models includes identifying purchasing patterns within the data and correlating the purchasing patterns with transactional information and physical actions taken by one or more users during transactions that generated the purchasing patterns, and wherein the training includes generating mapping information specific to one or more products determined to be discounted at a selected location according to the data of the social media network, and further generating a three-dimensional (3D) virtual representation of the one or more products at the selected location;
    receiving, by the one or more users via an interface, one or more target products on a list of target products to purchase;
    identifying, by the machine learning logic, one or more selected constraints for a current transaction to acquire the one or more target products according to the one or more transaction models;
    providing one or more actions to enhance a transaction experience of the current transaction initiated by the one or more users according to the one or more selected constraints, wherein the one or more actions are inclusive of a plurality of physical actions, performed in a sequential order prior to a monetary exchange associated with the current transaction, the one or more users are instructed to perform that will predictively enhance the transaction experience, and wherein the providing of the plurality of physical actions includes instructing the one or more users to move to at least one predetermined position within at least one predetermined geographical location to acquire the one or more target products according to the mapping information and the 3D virtual representation of the one or more products;
    subsequent to a completion of the current transaction, receiving feedback data from the one or more users with respect to an accuracy of the prediction that the one or more actions performed enhanced the transaction experience of the current transaction; and
    executing the machine learning logic to, in a second training stage, use the received feedback data as input to automatically re-train the one or more transaction models to iteratively improve the accuracy of the prediction with respect to one or more future actions to provide during a future transaction initiated by the one or more users in order to enhance the transaction experience of the future transaction.

2. The method of claim 1, further including collecting the data from one or more data sources relating to a list of targeted products or services offered for executing a transaction, transaction receipts, a user location, data maps associated with locations offering products or services available for executing the transaction, or a combination thereof.

3. The method of claim 1, further including defining the one or more selected constraints according to a defined transaction related goal of a user, a financial cost of the transaction, a predefined threshold for completing the one or more actions associated with executing the transaction, predicted positive or negative impacts upon the one or more users while executing the one or more actions, location parameters, weather conditions parameters, identified positive or negative impacts from the historical transaction experiences from the one or more users or entities associated with the one or more users in the social media network, community feedback data, or a combination thereof.

4. The method of claim 1, further including:
    capturing one or more images of one or more targeted products or services offered for executing a transaction;
    capturing one or more images of information associated with the one or more targeted products or services offered for executing the transaction; or
    capturing one or more images of one or more transaction receipts.

5. The method of claim 1, further including:
    identifying one or more targeted products or services offered for executing a transaction;
    collecting data from transaction receipts associated with the transaction executed by the one or more users; and
    tracking a location of the one or more users in relation to locations providing the one or more targeted products or services.

6. The method of claim 1, further including splitting the one or more actions into a plurality of sub-actions for execution by the one or more users.

7. A system for using an intelligent transaction optimization assistant, comprising:
    one or more computers with executable instructions that when executed cause the system to:
        receive data representative of historical transaction experiences, user behavior relating to the historical transaction experiences, and transaction experiences shared amongst entities associated with a social media network, wherein the historical transaction experiences further includes receipt data extracted from receipt imagery data and store data extracted from store imagery data;
        execute machine learning logic to, in a first training stage, train one or more transaction models using the data as input, wherein training the one or more transaction models includes identifying purchasing patterns within the data and correlating the purchasing patterns with transactional information and physical actions taken by one or more users during transactions that generated the purchasing patterns, and wherein the training includes generating mapping information specific to one or more products determined to be discounted at a selected location according to the data of the social media network, and further generating a three-dimensional (3D) virtual representation of the one or more products at the selected location;

receive, by the one or more users via an interface, one or more target products on a list of target products to purchase;

identify, by the machine learning logic, one or more selected constraints for a current transaction to acquire the one or more target products according to the one or more transaction models;

provide one or more actions to enhance a transaction experience of the current transaction initiated by the one or more users according to the one or more selected constraints, wherein the one or more actions are inclusive of a plurality of physical actions, performed in a sequential order prior to a monetary exchange associated with the current transaction, the one or more users are instructed to perform that will predictively enhance the transaction experience, and wherein the providing of the plurality of physical actions includes instructing the one or more users to move to at least one predetermined position within at least one predetermined geographical location to acquire the one or more target products according to the mapping information and the 3D virtual representation of the one or more products;

subsequent to a completion of the current transaction, receive feedback data from the one or more users with respect to an accuracy of the prediction that the one or more actions performed enhanced the transaction experience of the current transaction; and execute the machine learning logic to, in a second training stage, use the received feedback data as input to automatically re-train the one or more transaction models to iteratively improve the accuracy of the prediction with respect to one or more future actions to provide during a future transaction initiated by the one or more users in order to enhance the transaction experience of the future transaction.

8. The system of claim 7, wherein the executable instructions further collect the data from one or more data sources relating to a list of targeted products or services offered for executing a transaction, transaction receipts, a user location, data maps associated with locations offering products or services available for executing the transaction, or a combination thereof.

9. The system of claim 7, wherein the executable instructions further define the one or more selected constraints according to a defined transaction related goal of a user, a financial cost of the transaction, a predefined threshold for completing the one or more actions associated with executing the transaction, predicted positive or negative impacts upon the one or more users while executing the one or more actions, location parameters, weather conditions parameters, identified positive or negative impacts from the historical transaction experiences from the one or more users or entities associated with the one or more users in the social media network, community feedback data, or a combination thereof.

10. The system of claim 7, wherein the executable instructions further:

capture one or more images of one or more targeted products or services offered for executing a transaction;

capture one or more images of information associated with the one or more targeted products or services offered for executing the transaction; or capture one or more images of one or more transaction receipts.

11. The system of claim 7, wherein the executable instructions further:

identify one or more targeted products or services offered for executing a transaction;

collect data from transaction receipts associated with the transaction executed by the one or more users; and track a location of the one or more users in relation to locations providing the one or more targeted products or services.

12. The system of claim 7, wherein the executable instructions further split the one or more actions into a plurality of sub-actions for execution by the one or more users.

13. A computer program product for using an intelligent transaction optimization assistant by a processor, the computer program product comprising a non-transitory computer-readable storage medium having computer-readable program code portions stored therein, the computer-readable program code portions comprising:

an executable portion that receives data representative of historical transaction experiences, user behavior relating to the historical transaction experiences, and transaction experiences shared amongst entities associated with a social media network, wherein the historical transaction experiences further includes receipt data extracted from receipt imagery data and store data extracted from store imagery data;

an executable portion that executes machine learning logic to, in a first training stage, train one or more transaction models using the data as input, wherein training the one or more transaction models includes identifying purchasing patterns within the data and correlating the purchasing patterns with transactional information and physical actions taken by one or more users during transactions that generated the purchasing patterns, and wherein the training includes generating mapping information specific to one or more products determined to be discounted at a selected location according to the data of the social media network, and further generating a three-dimensional (3D) virtual representation of the one or more products at the selected location;

an executable portion that receives, by the one or more users via an interface, one or more target products on a list of target products to purchase;

an executable portion that identifies, by the machine learning logic, one or more selected constraints for a current transaction to acquire the one or more target products according to the one or more transaction models;

an executable portion that provides one or more actions to enhance a transaction experience of the current transaction initiated by the one or more users according to the one or more selected constraints, wherein the one or more actions are inclusive of a plurality of physical actions, performed in a sequential order prior to a monetary exchange associated with the current transaction, the one or more users are instructed to perform that will predictively enhance the transaction experience, and wherein the providing of the plurality of physical actions includes instructing the one or more users to move to at least one predetermined position within at least one predetermined geographical location to acquire the one or more target products according to the mapping information and the 3D virtual representation of the one or more products;

an executable portion that, subsequent to a completion of the current transaction, receives feedback data from the one or more users with respect to an accuracy of the prediction that the one or more actions performed enhanced the transaction experience of the current transaction; and an executable portion that executes the machine learning logic to, in a second training stage, use the received feedback data as input to automatically re-train the one or more transaction models to iteratively improve the accuracy of the prediction with respect to one or more future actions to provide during a future transaction initiated by the one or more users in order to enhance the transaction experience of the future transaction.

14. The computer program product of claim 13, further including an executable portion that collects the data from one or more data sources relating to a list of targeted products or services offered for executing a transaction, transaction receipts, a user location, data maps associated with locations offering products or services available for executing the transaction, or a combination thereof.

15. The computer program product of claim 13, further including an executable portion that defines the one or more selected constraints according to a defined transaction related goal of a user, a financial cost of the transaction, a predefined threshold for completing the one or more actions associated with executing the transaction, predicted positive or negative impacts upon the one or more users while executing the one or more actions, location parameters, weather conditions parameters, identified positive or negative impacts from the historical transaction experiences from the one or more users or entities associated with the one or more users in the social media network, community feedback data, or a combination thereof.

16. The computer program product of claim 13, further including an executable portion that:
capture one or more images of one or more targeted products or services offered for executing a transaction;
capture one or more images of information associated with the one or more targeted products or services offered for executing a transaction; or
capture one or more images of one or more transaction receipts.

17. The computer program product of claim 13, further including an executable portion that:
identifies one or more targeted products or services offered for executing a transaction;
collects data from transaction receipts associated with the transaction executed by the one or more users;
tracks a location of the one or more users in relation to locations providing the one or more targeted products or services; and
splits the one or more actions into a plurality of sub-actions for execution by the one or more users.

* * * * *